(12) United States Patent
Yamamoto

(10) Patent No.: US 10,195,527 B2
(45) Date of Patent: Feb. 5, 2019

(54) GAME SYSTEM, CONTROL METHOD USED THEREIN, AND NON-TRANSITORY COMPUTER READABLE STORAGE MEDIUM

(71) Applicant: KONAMI DIGITAL ENTERTAINMENT CO., LTD., Minato-ku, Tokyo (JP)

(72) Inventor: Takao Yamamoto, Minato-ku (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 606 days.

(21) Appl. No.: 14/589,789

(22) Filed: Jan. 5, 2015

(65) Prior Publication Data

US 2015/0119121 A1    Apr. 30, 2015

Related U.S. Application Data

(63) Continuation of application No. PCT/JP2013/068022, filed on Jul. 1, 2013.

(30) Foreign Application Priority Data

Jul. 6, 2012  (JP) .................. 2012-152929

(51) Int. Cl.
*A63F 13/00* (2014.01)
*A63F 13/40* (2014.01)
(Continued)

(52) U.S. Cl.
CPC ............ *A63F 13/40* (2014.09); *A63F 13/211* (2014.09); *A63F 13/45* (2014.09); *A63F 13/537* (2014.09); *A63F 13/80* (2014.09); *A63F 13/812* (2014.09)

(58) Field of Classification Search
CPC ....................................................... A63F 13/40
See application file for complete search history.

(56) References Cited

U.S. PATENT DOCUMENTS 6,375,572 B1   4/2002  Masuyama et al.
6,641,482 B2  11/2003  Masuyama et al.
(Continued)

FOREIGN PATENT DOCUMENTS

EP    2 320 309 A1    5/2011
JP    2000-155543 A   6/2000
(Continued)

OTHER PUBLICATIONS

Yamamoto, WO/2011/136303, see US 20130040733, published Nov. 3, 2011.*

(Continued)

*Primary Examiner* — Kang Hu
*Assistant Examiner* — Thomas H Henry
(74) *Attorney, Agent, or Firm* — Howard & Howard Attorneys PLLC

(57) ABSTRACT

The game system provides a game in which, by a player operating a touch panel when an object reaches a first determination line, the object can be hit back to a second determination line. The game machine includes a detection unit that detects tilting of the game machine. In a case that the detection unit detects tilting of the game machine when the player operates the touch panel, in a partial section of a moving path, the object moves at a moving speed that is set according to the tilting, and, in a remaining section, the object moves at a moving speed that is set so that the object moves from the first determination line to the second determination line in a setting time.

20 Claims, 11 Drawing Sheets

(51) Int. Cl.
*A63F 13/211* (2014.01)
*A63F 13/45* (2014.01)
*A63F 13/537* (2014.01)
*A63F 13/80* (2014.01)
*A63F 13/812* (2014.01)

(56) References Cited

U.S. PATENT DOCUMENTS

| | | | |
|---|---|---|---|
| 7,361,091 B2* | 4/2008 | Letovsky | A63F 13/10 463/23 |
| 7,601,066 B1 | 10/2009 | Masuyama et al. | |
| 2004/0029640 A1* | 2/2004 | Masuyama | A63F 13/428 463/43 |
| 2007/0178974 A1 | 8/2007 | Masuyama et al. | |
| 2009/0036213 A1 | 2/2009 | Masuyama et al. | |
| 2009/0325698 A1 | 12/2009 | Masuyama et al. | |
| 2011/0312419 A1 | 12/2011 | Masuyama et al. | |
| 2012/0004032 A1 | 1/2012 | Masuyama et al. | |
| 2013/0040733 A1* | 2/2013 | Yamamoto | A63F 13/69 463/31 |
| 2013/0040734 A1 | 2/2013 | Yamamoto et al. | |
| 2014/0011588 A1 | 1/2014 | Masuyama et al. | |

FOREIGN PATENT DOCUMENTS

| | | |
|---|---|---|
| JP | 2001-170358 A | 6/2001 |
| JP | 2011229769 A | 11/2011 |
| JP | 5613728 B2 | 10/2014 |
| KR | 10-2006-0020352 A | 3/2006 |
| KR | 10-2011-0040665 A | 4/2011 |
| WO | 2011/136303 A1 | 11/2011 |

OTHER PUBLICATIONS

International Search Report (PCT/JP2013/068022); dated Sep. 24, 2013.
Japanese Office Action with English Translation; dated Sep. 17, 2013.
Reflec Beat plus, Gekkan Arcadia, Oct. 29, 2011 (Oct. 29, 2011), vol. 12, No. 12, whole No. 139, p. 041.
Windows Phone Game Programming, downloaded Apr. 5, 2016, pp. 1-13 (English Translation).
Decision of Refusal (JP Patent Appln. No. 2014-182639); Published: Jun. 27, 2017; 8 pages; English Translation included.
Decision to Grant a Patent (JP Patent Application No. 2014-182639); dated Dec. 21, 2017; Includes English Translation and Original; 6 pages.

* cited by examiner

GAME SYSTEM, CONTROL METHOD USED THEREIN, AND NON-TRANSITORY COMPUTER READABLE STORAGE MEDIUM

CROSS-REFERENCE TO RELATED APPLICATION

This application is a continuation of PCT Application No. PCT/JP2013/068022, filed Jul. 1, 2013, which claims priority to Japanese Patent Application No. 2012-152929, filed Jul. 6, 2012, the disclosures of which are hereby incorporated by reference in their entirety.

TECHNICAL FIELD

The present invention relates to a game system which provide a game that is played by a player so that the player hits an object whose operation timing is designated back, and a control method used therein and a non-transitory computer readable storage medium storing a computer program used therein.

BACKGROUND ART

A game machine of a match-up type is well known that is played by two players who alternatingly hit to and fro an object whose operation timing is designated, and in which the speed of the object back toward the opponent changes according to the position of the object at the time point that the players hit the object back (see Patent Literature 1).

CITATION LIST

Patent Literature

Patent Literature 1: Japanese Patent Application Laid-Open (JP-A) No. 2000-155543.

SUMMARY OF INVENTION

Technical Problem

A portable game machine, a smart phone, or a portable type tablet terminal apparatus or the like to which a sensor is provided that detects its own tilt with respect to the horizontal plane is well known. If a game were to be played by a player on an apparatus of this sort, by making the tilting of the apparatus be reflected in the game, it would be possible to make an object move as though gravity were actually operating upon that object, even though the object were only present within the game. Due to this, the interest of the game could be enhanced.

In this regard, an object of the present invention is to provide a game system that, when the game device is tilted, are capable of reflecting this tilting in the game, so that, due to this, the interest of the game can be enhanced, a control method employed therein, and a non-transitory computer readable storage medium storing a computer program.

Solution to Problem

A game system of the present invention includes a game machine comprising a display unit that displays a game screen and an operating unit that is operated by a player, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent; wherein the game machine has a tilt detection device that detects tilting of the game machine with respect to the horizontal plane, and the game system comprises: a path setting device configured to, when the operation indication mark arrives at the first reference portion and the operating unit is operated by the player, set a moving path which is a path along which the operation indication mark is to move from the first reference portion until arriving at the second reference portion; a speed setting device configured to obtain tilting of the game machine detected by the tilt detection device when the operation indication mark arrives at the first reference portion and the operating unit is operated by the player, and to set a moving speed of the operation indication mark in a partial section of the moving path on the basis of the tilting of the game machine that is obtained; an adjustment device configured to set a moving speed of the operation indication mark in a remaining section, which is the section of the moving path other than the partial section, on the basis of the moving speed of the operation indication mark in the partial section that is set by the speed setting device, so that the operation indication mark moves from the first reference portion to the second reference portion in a setting time; and a control device configured to control the operation indication mark so that the operation indication mark moves at the moving speed set by the speed setting device in the partial section, and so that the operation indication mark moves at the moving speed set by the adjustment device in the remaining section.

A control method of the present invention is a control method for controlling a computer incorporated into a game system, the game system that includes a game machine comprising: a display unit that displays a game screen; an operating unit that is operated by a player; and a tilt detection device that detects tilting of the game machine with respect to the horizontal plane, and providing a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the control method making the computer execute the steps including: a path setting step of, when the operation indication mark arrives at the first reference portion and the operating unit is operated by the player, setting a moving path which is a path along which the operation indication mark is to move from the first reference portion until arriving at the second reference portion; a speed setting step of obtaining tilting of the game machine detected by the tilt detection device when the operation indication mark arrives at the first reference portion and the operating unit is operated by the player, and of setting a moving speed of the operation indication mark in a partial section of the moving path on the basis of the tilting of the game machine that is obtained; an adjustment step of setting a moving speed of the operation indication mark in a remaining section, which is the section of the moving path other than the partial section, on the basis of the moving speed of the operation indication mark in the partial section that is set in the speed setting step, so that the operation indication mark moves from the first reference portion to the second reference portion in a setting time; and a control step of controlling the operation indication mark so that the operation indication mark moves at the moving speed set in the speed setting step in the partial section, and so that the operation indication mark moves at the moving speed set in the adjustment step in the remaining section.

A non-transitory computer readable medium of the present invention is a non-transitory computer readable storage medium storing a computer program for a game system that includes a game machine comprising: a display unit that displays a game screen; an operating unit that is operated by a player; and a tilt detection device that detects tilting of the game machine with respect to the horizontal plane, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the computer program making a computer incorporated into the game system function as: a path setting device configured to, when the operation indication mark arrives at the first reference portion and the operating unit is operated by the player, set a moving path which is a path along which the operation indication mark is to move from the first reference portion until arriving at the second reference portion; a speed setting device configured to obtain tilting of the game machine detected by the tilt detection device when the operation indication mark arrives at the first reference portion and the operating unit is operated by the player, and to set a moving speed of the operation indication mark in a partial section of the moving path on the basis of the tilting of the game machine that is obtained; an adjustment device configured to set a moving speed of the operation indication mark in a remaining section, which is the section of the moving path other than the partial section, on the basis of the moving speed of the operation indication mark in the partial section that is set by the speed setting device, so that the operation indication mark moves from the first reference portion to the second reference portion in a setting time; and a control device configured to control the operation indication mark so that the operation indication mark moves at the moving speed set by the speed setting device in the partial section, and so that the operation indication mark moves at the moving speed set by the adjustment device in the remaining section.

DESCRIPTION OF EMBODIMENTS

Figure 1:
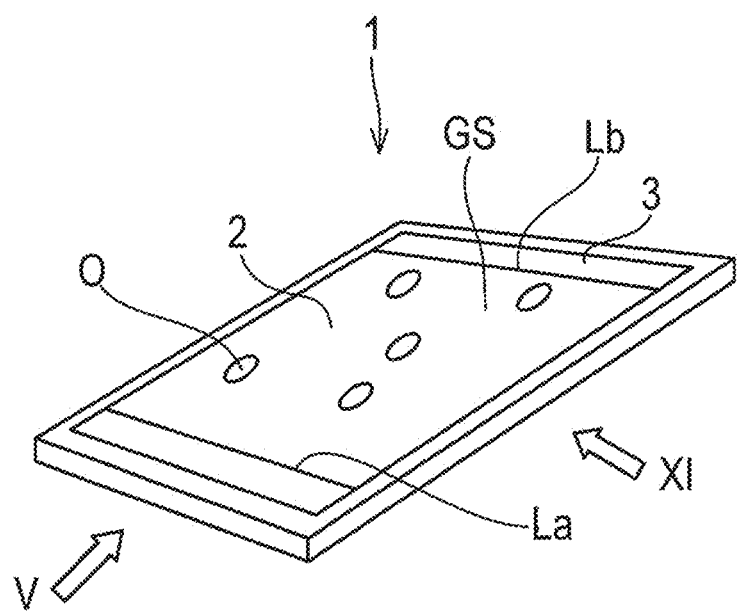
FIG. 1 is a schematic diagram showing a game machine which is included in a game system according to one embodiment of the present invention.

FIG. 1 is a schematic diagram showing a game machine which is included in a game system according to an embodiment of the present invention. This game machine 1 is a portable electronic apparatus that comprises a monitor 2. A transparent touch panel 3 is overlaid over the front surface of the monitor 2. This touch panel 3 is a well known input device that, when the player touches it with his finger or the like, outputs a signal according to the position of contact. The monitor 2 serves the function of a display unit, and the touch panel 3 serves the function of an operating unit. A portable game machine, a smart phone, a portable telephone, a portable type tablet terminal apparatus or the like may be applied as the portable type electronic apparatus. Moreover, the portable type electronic apparatus is provided with a detection unit 4 (refer to FIG. 2) which detects change of the relative position of the game machine 1 including the touch panel 3. The detection unit 4 detects tilting of a game screen GS of the game machine 1 (i.e. the touch panel 3) with respect to the horizontal plane. A sensor of any of various well known types may be applied as the detection unit 4 that detects change of the position of the game machine 1, such as an acceleration sensor, a gyro sensor, a gravity sensor, a magnetic sensor, or the like. Moreover, any of various well known types of technique may be applied for detecting tilting of the game machine 1. The detection unit 4 corresponds to a tilt detection device of the present invention. In the game machine 1, a game screen GS that an object O as an operation indication mark, a first determination line La, and a second determination line Lb appear, is displayed upon the monitor 2. As shown in this figure, the first determination line La and the second determination line Lb are arranged with a certain mutual gap being left between them. In the following description, when there is no need to distinguish between these determination lines, a reference may simply be made to the determination line(s) L. And, a music game that the player is caused to perform operation of the touch panel 3 at the timing that the object O coincides with a determination line L in time with reproduction of music (musical composition) selected by the player, is performed. In the music game, the operation of the player is evaluated according to the operation timing thereof (refer to FIG. 3). The details will be described hereinafter.

Figure 2:
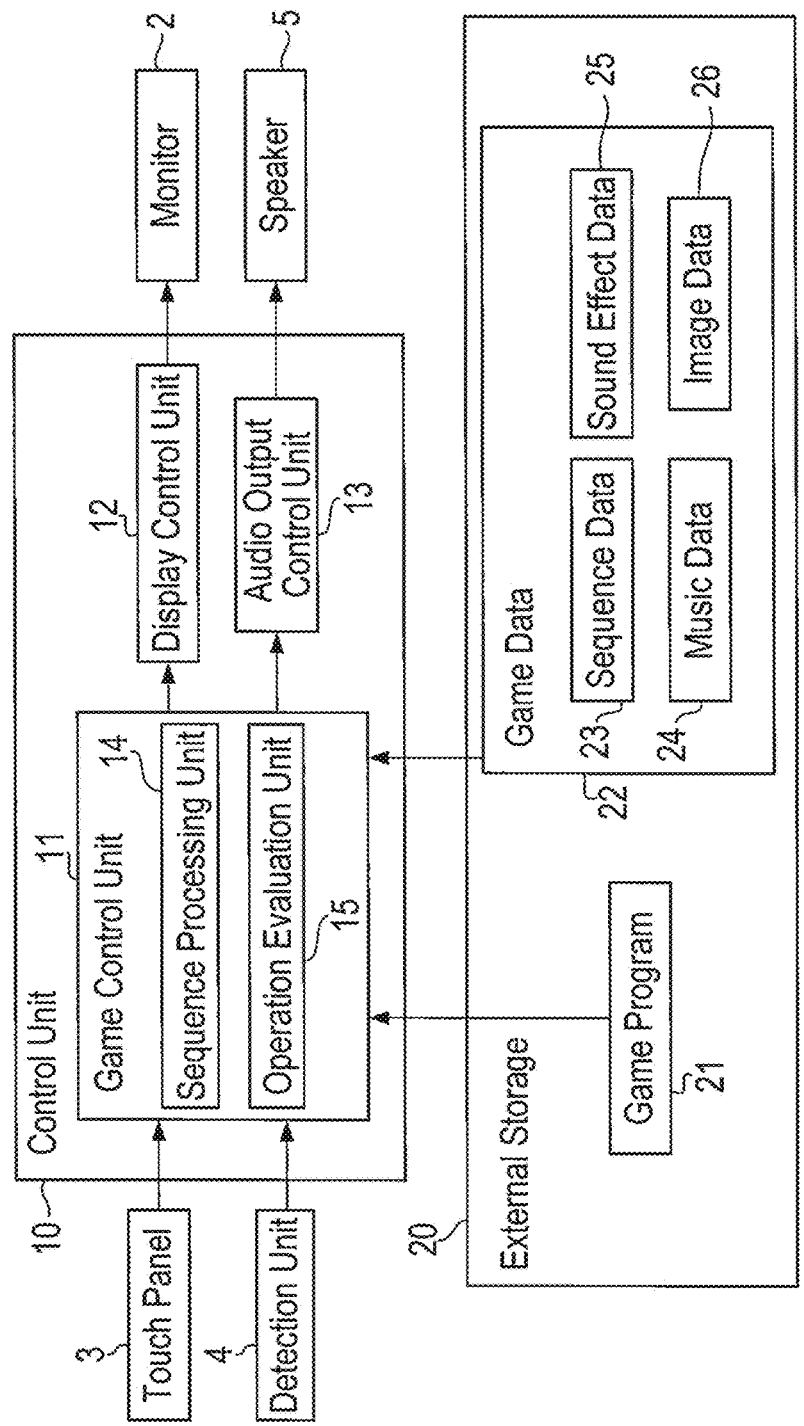
FIG. 2 is a functional block diagram of the game machine.

A functional block diagram of the game machine 1 is shown in FIG. 2. The game machine 1 comprises a control unit 10 as a computer. The control unit 10 comprises a game control unit 11, a display control unit 12, and an audio output control unit 13. The display control unit 12 and the audio output control unit 13 operate according to an output from the game control unit 11. The game control unit 11 is configured as a unit in which a microprocessor is combined with various kinds of peripheral apparatus such as an internal storage (for example, a ROM and a RAM) necessary for operations of the microprocessor. The touch panel 3 that receives operations by the player and the detection unit 4 which detects change of the relative position of the game machine 1 are connected to the game control unit 11. The display control unit 12 causes a predetermined image to be displayed on the monitor 2 by rendering an image corresponding to image data provided from the game control unit 11 in a frame buffer and then outputting a video signal corresponding to the rendered image to the monitor 2. The audio output control unit 13 causes a predetermined sound (including music or the like) to be reproduced from a speaker 5 of the game machine 1 by generating an audio reproduction signal corresponding to audio reproduction data provided from the game control unit 11 and then outputting the generated audio reproduction signal to the speaker 5.

Moreover, an external storage 20 is connected to the game control unit 11. As the external storage 20, there is used a storage medium in which data remains stored even when power is not supplied, such as a non-volatile semiconductor memory apparatus such as an EEPROM or the like, or a magnetic storage apparatus. The storage medium of the external storage 20 may be detachable from the game machine 1.

A game program 21 and game data 22 are stored in the external storage 20. The game program 21 is a computer program that is required for execution of a predetermined music game upon the game machine 1. When the game machine 1 is activated, the game control unit 11 executes various kinds of initial settings necessary to operate as the game machine 1 by executing an operation program stored in an internal storage thereof. And then, the game control unit 11 sets an environment for executing the music game according to the game program 21 by reading the game program 21 from the external storage 20 and executing the game program 21. By the execution of this game program 21, a sequence processing unit 14 and an operation evaluation unit 15 are generated in the game control unit 11. The sequence processing unit 14 and the operation evaluation unit 15 are logical apparatuses that are actualized by combinations of computer hardware and a computer program. The sequence processing unit 14 executes processing necessary for the music game such as processing of instructing the player to make operations in time with reproduction of music, and processing of generating sound effects in response to the operations by the player. The operation evaluation unit 15 executes processing of evaluating the operations by the player, and of commanding audio output according to the results of such evaluation. By the execution of the game program 21, various types of logical apparatus other than the ones described above may be also generated in the game control unit 11.

The game data 22 includes various types of data to be referred to when the music game is executed according to the game program 21. For example, sequence data 23, music data 24, sound effect data 25, and image data 26 are included in the game data 22. The sequence data 23 is data that defines operations and so on which the player is to be indicated to perform. At least a piece of the sequence data 23 is prepared for a single music data. A plurality of kinds of sequence data 23 may also be prepared for single music data, such as changes of its difficulty level or the like. The music data 24 is data that is required for reproducing and outputting from the speaker 5 the music that is to be the target of the game. While music data 24 of only one type is shown in FIG. 2, actually, it is possible for the player to select music to be played from a plurality of different music. In the game data 22, this plurality of different music data 24 are recorded by being appended information for identifying each music. The sound effect data 25 is data in which sound effects of a plurality of types that are to be outputted from the speaker 5 in response to operation by the player are recorded in correspondence with a unique code for each sound effect. These sound effects include sounds of musical instruments and various kinds of sounds. The image data 26 is data for displaying a background image, objects O of various kinds, icons, and so on in the game screen GS on the monitor 2.

Figure 3:
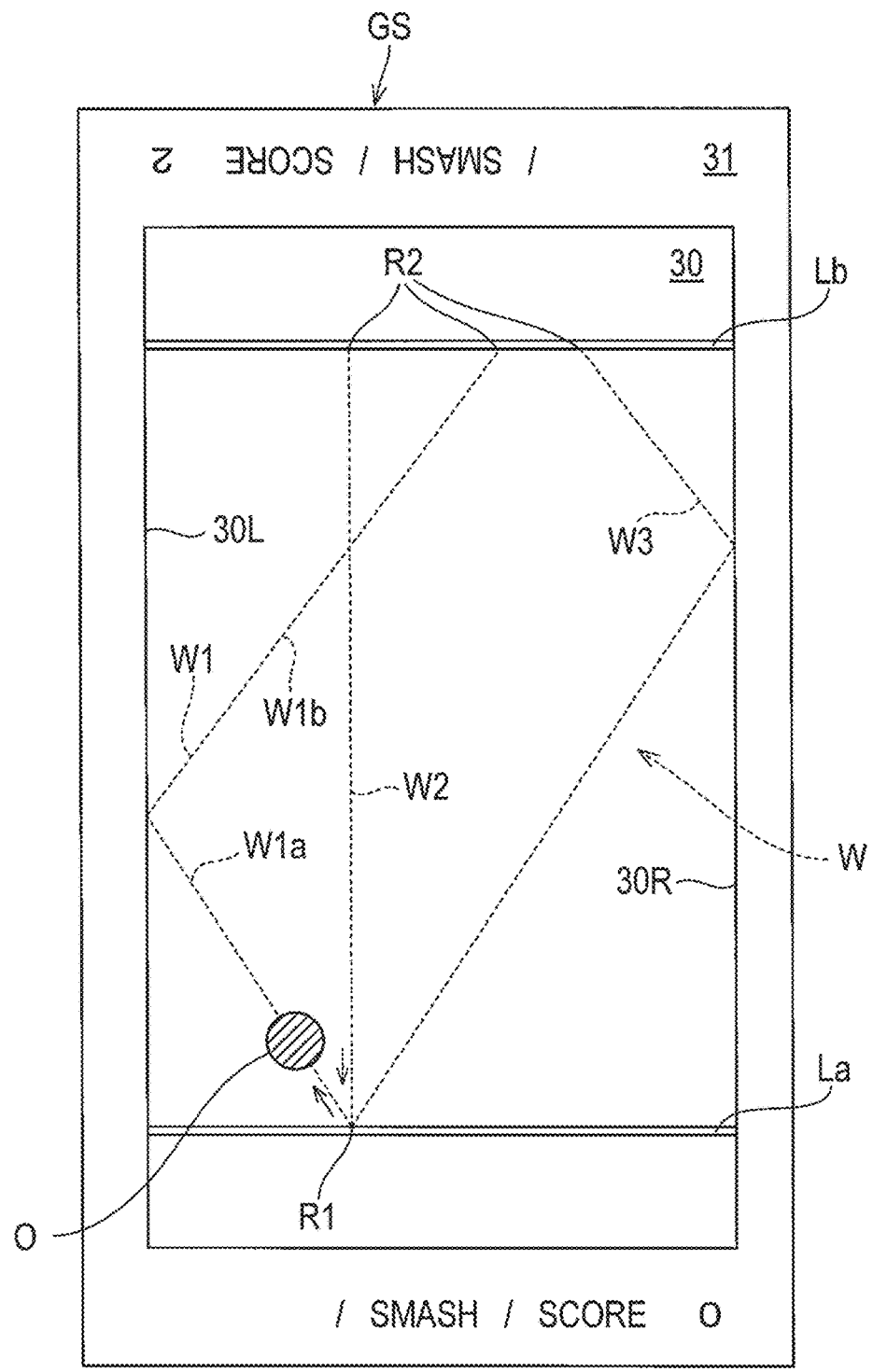
FIG. 3 is a diagram schematically showing a game screen.

Next, an outline of the music game that is executed on the game machine 1 will be described with reference to FIG. 3. FIG. 3 is a diagram schematically showing the game screen GS. In the game machine 1, a music game of a match-up type is executed. In the music game, two players (including a case in which the game machine 1 functions as one of the players) perform operations in time with music, and compete by evaluating the operation timings of the two players. When the game machine 1 functions as one of the players, and the player is to play a one-person game, the player plays the game while holding the game machine 1 in his hand. When two players are to play the game upon a single game machine 1, one of the players holds the edge of the side thereof at which the first determination line La is displayed (i.e. the edge of the lower side in FIG. 3) in his hand, while the other player holds the edge of the side at which the second determination line Lb is displayed (i.e. the edge of the upper side in FIG. 3) in his hand, and they play while facing one another. Since they play the game in this manner, from the point of view of the first player, the first determination line La corresponds to a first reference portion of the present invention, and the second determination line Lb corresponds to a second reference portion of the present invention. On the other hand, from the point of view of the second player, the second determination line Lb corresponds to the first reference portion of the present invention, and the first determination line La corresponds to the second reference portion of the present invention.

The game screen GS includes a game region 30 for teaching the operation timings to the player and an information region 31 for displaying score of each player and so on. The game region 30 is formed as a rectangle. The first determination line La and the second determination line Lb are arranged on both ends of the game region 30 in a longitudinal direction so as to face each other. Each of the determination lines La and Lb extends in rectilinear form along the direction orthogonal to the longitudinal direction of the game region 30. Each of the determination lines La and Lb is employed as a reference of a current time on the game by the respective player of the game. Specifically, the first determination line La is employed as a reference of a current time of the first player, and the second determination line Lb is employed as a reference of a current time of the second player. In the example of FIG. 3, a straight line in red color is employed as the first determination line La, while a straight line in blue color is employed as the second determination line Lb, so that a different color is used for each player in order to distinguish the players. Furthermore, the information region 31 is arranged around the game region 30. In the information region 31, one end side of the game region 30 in the longitudinal direction is used for displaying a score and so on of the one player, while the other end side of the game region 30 is used for displaying a score and so on of the other player.

Each of the determination lines La and Lb includes a plurality of rebounding points arranged at predetermined intervals. A rebounding point R1 that is included on the first determination line La and a plurality of rebounding points R2 that is included on the second determination line Lb are connected with each other through a plurality of paths W. In other words, a plurality of paths W are provided from one rebounding point R1 that is included on the first determination line La up to a plurality of rebounding points R2 that are included on the second determination line Lb. The three broken lines in FIG. 3 show three paths W1, W2, and W3 that all connect the rebounding point R1 and the rebounding points R2. In the example of FIG. 3, at the rebounding point R1 which is on the first determination line La, the three paths W1, W2, and W3 are provided so as to extend from this rebounding point R1 to the three rebounding points R2 which are included on the second determination line Lb. During execution of the music game, in other words during the progression of reproduction of the music, an object O indicating operations is displayed upon the path W that connects the rebounding point R1 and the rebounding point R2 according to the sequence data 23. In FIG. 3, for the convenience of description, the paths W1, W2, and W3 are shown by the broken lines. However, none of the plurality of paths W are displayed upon the actual game screen GS.

The object O appears at the rebounding point R1 or at the rebounding point R2 at an appropriate timing in the music. Furthermore, according to the progress of the music, the object O moves upon the path W that extends from the rebounding point R1 or R2 at the appearance position, toward the other of the rebounding point R1 or R2 that is positioned at the opposite side from one of the rebounding point R1 or R2 at the appearance position. And, the rebounding point R1 or R2 at which the object O has arrived becomes an appearance position of a next object O. Then, the next object O moves from the appearance position towards a rebounding point R1 or R2 that is positioned at the opposite side. Due to this, the object O repeatedly moves between the determination lines La and Lb so as to alternately rebound at the rebounding points R1 and R2. Moreover, in time with the arrival of the object O at the determination line La or Lb, a request is made to the player who is using that determination line La or Lb at which the object O has arrived as a current time reference to perform a touch operation of touching the position on the determination line La or Lb at which the object O has arrived. When the touch operation is performed by the player, there is detected a time difference between a time when the object O matches each of the determination line La or Lb and a time when each player has performed the touch operation. The smaller the time difference is, the higher the operation of the player is evaluated. Moreover, a sound effect is reproduced from the speaker 5 in response to the touch operation. A well-known method may be used as the method of reproducing the sound effect. For example, as the well-known method of reproducing the sound effect, there exist a method of adding a sound effect from music while reproducing the music, and a method of reproducing a sound effect corresponding to a miss operation while muting the music when missed. Moreover, for example, there also exists a method in which when music is divided in parts, each part is assigned to each operation timing, and the appropriate operations are executed, a part of the music assigned to the corresponding operation timing is played back (a method of forming the music by the appropriate operation at each operation timing. Due to this, when a miss operation is made, a part of the music to which the operation timing is assigned is not reproduced).

In the example of FIG. 3, the object O is in the process of moving upward along the path W1 towards the rebounding point R2 on the second determination line Lb. In this case, the second player, who is using the second determination line Lb as his current time reference, may perform the touch operation to touch the position on the second determination line Lb at which the object O arrives, this touching being matched to the arrival of the object O at the second determination line Lb. Furthermore, the object O is displayed in a color that corresponds to the determination line La or Lb of a destination toward which the object O is currently moving. In other words, in the example of FIG. 3, the object O is displayed in blue color until it arrives at the rebounding point R2 on the second determination line Lb, and the next object O appearing at the rebounding point R2 at the arrival position is displayed in red color.

Figure 4:
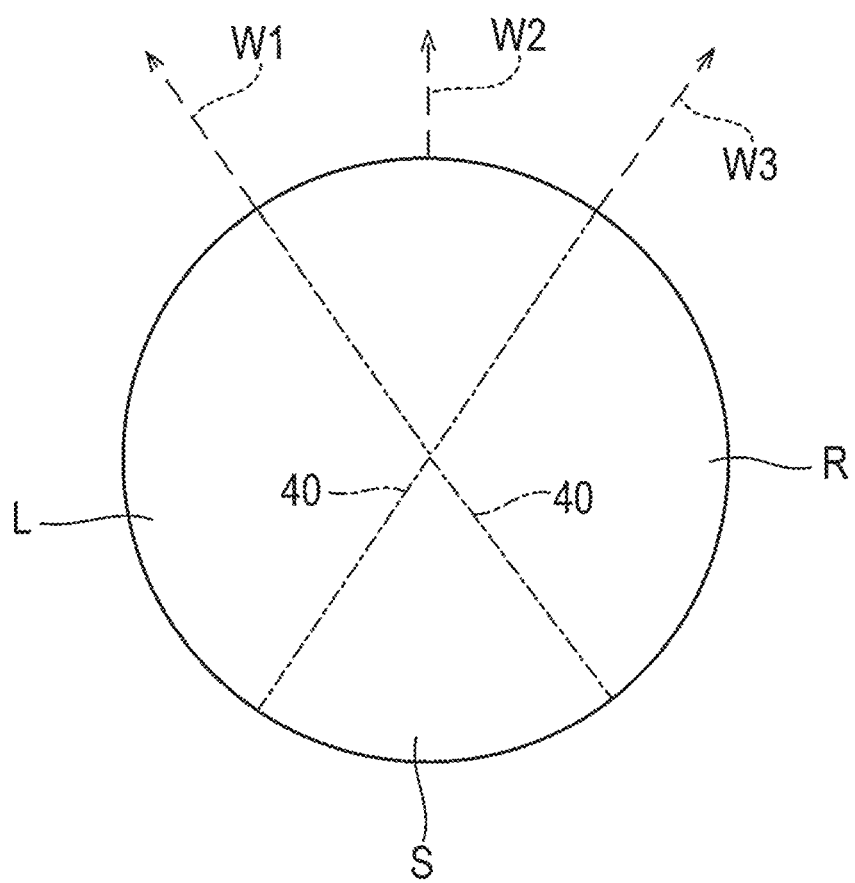
FIG. 4 is a diagram for description of regions upon an object.

The path W for the object O to move from the rebounding point R1 or R2 at which it has arrived to the rebounding point R1 or R2 at the opposite side is determined based on positions of the object O when the determination line La or Lb is touched. In order to make correlation with the position simple, the object O is divided into a plurality of regions. FIG. 4 is a diagram for description of these regions upon the object O. The broken lines in FIG. 4 indicate the paths W1, W2, and W3, and an alternate long and short dash lines 40 show the boundaries of the regions. In the example of FIG. 4, the object O is divided into four regions. In the four regions, there are included a contact region S that is a region near a contact point where the object O first comes in contact with each determination line La or Lb, a right side region R and a left side region L that the contact region S is a boundary, and a remaining region. And, as the path along which the object O moves, when near the contact region S or the remaining region are touched, the straight line path W2 reaching to the rebounding point R1 at the shortest distance is selected from among the paths W from the rebounding point R2 toward the rebounding point R1. When near the left side region L is touched, the right side path W3 reaching to the rebounding point P1 through the right side wall 30R in the longitudinal direction of the game region 30 is selected. And, when near the right side region R is touched, the left side path W1 reaching to the rebounding point P1 through the left side wall 30L in the longitudinal direction of the game region 30 is selected. In other words, a moving path when the object O proceeds toward the next determination line La or Lb is determined according to a positional relationship between the position at which the touch operation is performed and the position of the object O. Since a moving distance is different according to the moving path, the moving distance along which the object O moves to the next determination line La or Lb differs, according to the positional relationship between the operation position and the position of the object O. On the other hand, the operation timing to touch the object O, in other words the timing at which the object O arrives at each of the determination line La or Lb is constant regardless of the moving path. Due to this, a moving speed of the object O differs according to the moving path. In other words, according to the touch operation by one player, the path W and the moving speed of the object O toward the other player change. Since a difficulty level of the game changes due to this, each player will perform his own operation while being conscious of influence on the other player.

Figure 5:
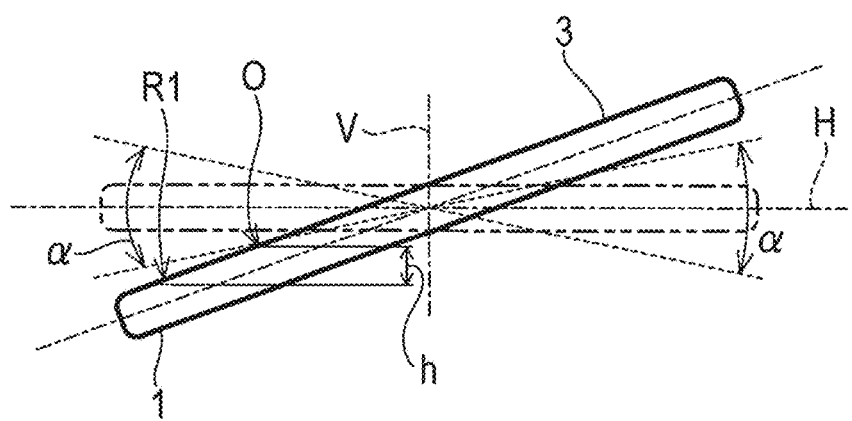
FIG. 5 is a diagram for description of tilting of the game machine in the left/right direction.

Moreover, in this game, the moving speed of the object O toward the next determination line is set according to tilting of the game machine 1 in the left/right direction in FIG. 3 when the object O arrives at the determination line L and the player has performed touch operation at the arrival position. FIG. 5 is a diagram showing the game machine 1 viewed from the direction of the arrow V in FIG. 1. Due to this, the left side in this figure corresponds to the left side in FIG. 3, while the right side corresponds to the right side in FIG. 3. In this figure, the horizontal plane H and a vertical line V are both shown by alternate long and short dash lines. Moreover, the game machine 1 is shown by alternate long and two short dashes lines in its state in which it is parallel to the horizontal plane H (i.e. in the horizontal state).

In this game, if, even though the game machine 1 is tilted from the horizontal state with respect to the left/right direction, the amount of this tilting is within a permitted range α of this figure, then this tilting of the game machine 1 is not reflected in the moving speed of the object O. In this case, the object O moves along the moving path determined by the method described above from the one determination line toward the other determination line at a constant speed (hereinafter sometimes this will be referred to as a standard speed). As described above, the operation timing at which the touch operation of the object O must occur, that is, the timing at which the object O must arrive at the determination line La or Lb, is set in advance according to the music. In other words, moving time for the object O to move from the first determination line La to the second determination line Lb is set in advance according to the music. Thereby, when the moving path is determined, the standard speed is determined. The moving time corresponds to a setting time of the present invention.

On the other hand, when the game machine 1 is tilted by the permitted range α or more as shown in the example of this figure, the tilting of the game machine 1 is reflected in the moving speed of the object O. Specifically, a case will be described in which, when the moving path from the first determination line La to the second determination line Lb has been determined by the method described above to be the path W1 and also the first player has performed touch operation, the game machine 1 is tilted to the state shown in FIG. 5, in other words to the state in which the left side of the game screen GS of FIG. 3 is positioned lower than its right side. In this case, the moving path W1 is divided into a first section W1a from the first determination line La to the left side wall 30L, and a second section W1b from the left side wall 30L to the second determination line Lb. And, a speed of the object O in these two sections are set so that the object O accelerates in the first section W1a and so that the object O decelerates in the second section W1b. In this case, an angle through which the game machine 1 is tilted is obtained from a detection result by the detection unit 4. Thereafter, the height h (refer to FIG. 5), that is actually created between the object O at each position within the first section W1a and the rebounding point R1 in the game machine 1, is calculated on the basis of this angle. And, a speed (i.e. an added speed), that is to be added to the standard speed at each position at which the object O moves within the first section W1a, is calculated from a well-known formula for obtaining fall velocity on the basis of the height h obtained from the angle of the game machine 1 and the acceleration of gravity. A value obtained by adding the added speed that has been calculated in this manner to the standard speed is set as the moving speed of the object O at each position within the first section W1a.

As described above, the timing at which the object O must arrive at the determination line La or Lb (i.e. the operation timing) is set in advance. Thus, the moving speed of the object O in the second section W1b is set so that the object O, which was accelerated in the first section W1a, arrives at the second determination line Lb at the operation timing that was set in advance. However, as described above, the object O moves through the second section W1b while decelerating. It would be acceptable to arrange for the deceleration at this time to be set so that the object O decelerates at a constant rate from the left side wall 30L to the second determination line Lb; or, alternatively, it would also be acceptable to arrange for the deceleration to be set so that it becomes greater as the object O approaches the second determination line Lb. By doing this, the object O arrives at the second determination line Lb at the operation timing that has been set in advance. By setting the moving speed in each section in this manner, the first section W1a corresponds to a partial section of the present invention, and the second section W1b corresponds to a remaining section of the present invention.

In the example above described, if the game machine 1 is tilted the other way, in other words if, when the first player performs the touch operation, the right side of the game screen GS is positioned lower than its left side, then the speed of the object O in each section is set so that the object O decelerates in the first section W1a and so that the object O accelerates in the second section W1b. In this case as well, the angle by which the game machine 1 has been tilted is obtained from the detection result by the detection unit 4, and, the height h that is actually created by the game machine 1 between the object O at each position within the first section W1a and the rebounding point R1 is calculated on the basis of this angle. Thereafter, a speed (i.e. a reduction speed), which is to be subtracted from the standard speed at each position in the first section W1a, is calculated on the basis of the height h and the acceleration of gravity. And, a value obtained by subtracting the reduction speed that has been calculated in this manner from the standard speed is set as the moving speed of the object O at each position within the first section W1a.

In this case, the moving speed of the object O in the second section W1b is set so that the object O, which was decelerated in the first section W1a, arrives at the second determination line Lb at the operation timing that was set in advance. And the object O moves through the second section W1b while accelerating. It would be acceptable to arrange for the acceleration at this time to be set so that the object O accelerates at a constant rate from the left side wall 30L to the second determination line Lb; or, alternatively, it would also be acceptable to arrange for the acceleration to be set so that it becomes greater as the object O approaches the second determination line Lb.

As is clear from FIG. 3, if the moving path from the first determination line La to the second determination line Lb is the path W2, then the object O moves straight toward the second determination line Lb. Thereby, in this case, the standard speed is set for the moving speed of the object O regardless of any tilting of the game machine 1. While a detailed description of the case in which the moving path is the path W3 is omitted, in this case, the first section is set as being from the first determination line La to the right side wall 30R, and the second section is set as being from the right side wall 30R to the second determination line Lb. And, the moving speed of the object O may be set by using a method that is similar to the case described above of the path W1, so that, when the game machine 1 has been tilted, gravity appears to act upon the object O.

Figure 6:
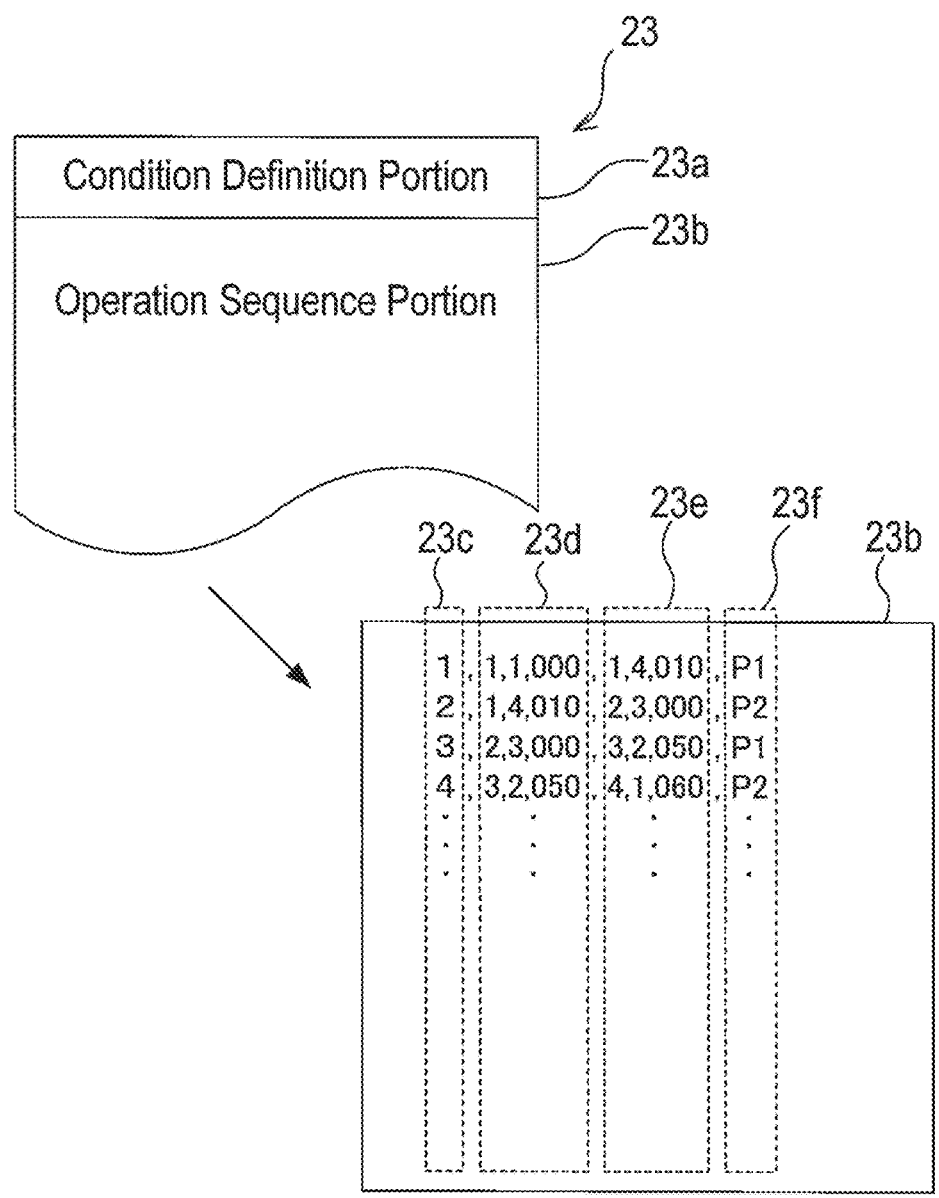
FIG. 6 is a diagram showing an example of contents of the sequence data.

Next, the sequence data 23 will be described with reference to FIG. 6. The sequence data 23 is data for defining timings at which appropriate operations are required to the players, in other words for defining the operation timings that the player must perform the appropriate operations. FIG. 6 is a diagram showing an example of contents of the sequence data 23. As shown in FIG. 6, the sequence data 23 includes a condition definition portion 23a and an operation sequence portion 23b. In the condition definition portion 23a, there is described information designating an execution condition of a game that differs according to the music such as information designating the tempo, a beat, a track of music, and a sound effect to be generated when the touch operation is performed on the object O. In FIG. 6, the condition definition portion 23a is included only in the head portion of the sequence data 23, but the condition definition portion 23a may be added to an appropriate intermediate position of the operation sequence portion 23b. By doing this, processing of changing the tempo of the music, an assignment of sound effects, or the like can be actualized.

As shown in this figure, the operation sequence portion 23b includes a mark information portion 23c, a display start timing portion 23d, an arrival timing portion 23e, and an arrival position portion 23f. Object IDs are described in the mark information portion 23c. Start timings for display of the objects O are described in the display start timing portion 23d. Arrival timings of the objects O (i.e. operational timings) are described in the arrival timing portion 23e. And, the determination lines L at which the objects O must arrive (i.e. the arrival determination lines) are described in the arrival position portion 23f. The operation sequence portion 23b is configured as a set of records in which these object IDs, display start timings, arrival timings, and arrival determination lines are described so as to be associated with each other. As a portion thereof is shown in FIG. 6, in the operation sequence portion 23b, these items of information are described in a row for each of the objects O. And, in the example shown in this figure, the object IDs, the display start timings, the arrival timings, and the arrival determination lines are described in the operation sequence portion 23b from the left in that order.

The object IDs are information for managing various objects O. Moreover, the object IDs are also used for management of the records included in the operation sequence section 23b. As object IDs, for example, a unique number may be used for each of the objects O. The arrival determination lines are information for specifying the determination lines L at which the objects O must arrive, as described above. In other words, the arrival determination lines function as information for designating the players who must be indicated the operation timings. Moreover, the information for the arrival determination lines also functions as information that specifies the determination lines L where the objects O must be generated. For example, when the first determination line La is being specified as the arrival determination line, then the objects O are generated at the second determination line Lb that is at the opposite position thereto. With regard to an indication of the player specified by the arrival determination line, "P1" is described when the first player is being designated, while "P2" is described when the second player is being designated. The indication of the player also corresponds to an indication of the color of the objects O that are displayed: in the case of "P1" the object O is displayed in red color, while in the case of "P2" the object O is displayed in blue color.

The display start timings are information corresponding to the times at which the objects O are to be generated upon the game screen GS. On the other hand, the arrival timings are information corresponding to the times at which the objects O that have been generated upon the game screen GS must arrive at the determination lines La and Lb. Accordingly, the arrival timings also function as operation timings at which appropriate operations are to be performed in the music. And, the time periods between the display start timings and the arrival timings correspond to the setting time of the present invention. The display start timings and the arrival timings are described such that bar numbers in the music, beat numbers, and values representing time in beats are separated by commas. The time in a beat refers to an elapsed time from the head of one beat. And, for example, the time in the beat is represented by the number of units, from the head of the beat, obtained by equally dividing the length of one beat into n unit times. For example, when a time in which n is 100, and ¼ elapses from the head of the second beat in the second beat of the first bar of music is designated as an operation timing (i.e. an arrival timing), "01, 2, 025" is described.

In the example of FIG. 6, a display start timing, an arrival timing, and an arrival determination line are indicated so that, at the start time point (000) of the first beat of the first bar, the object O is displayed in red color upon the second determination line Lb that is used by the second player as a reference, and then the object O moves along a path W from the second determination line Lb, so as to arrive at the first determination line La at a timing when a period corresponding to just "010" has elapsed from the start time point of the fourth beat of the first bar.

Furthermore, in the example of FIG. 6, a correspondence relationship is indicated between the operational timings of the object IDs. In the example of FIG. 6, a correspondence relationship is indicated so that an arrival position of an object O, that is displayed upon the second determination line Lb at the start time point (000) of the first beat of the first bar, and arrives on the first determination line La at a timing when a period corresponding to just "010" has elapsed from the start time point of the fourth beat of the first bar, functions as an appearance position of an object O, that is displayed on the first determination line La at the timing when the period corresponding to just "010" has elapsed from the start time point of the fourth bar of the first tune, and moves so as to arrive at the second determination line Lb at a timing when a period corresponding to just "000" has elapsed from the start time point of the third beat of the second bar. In the example of FIG. 6, between the operation timings that have the correspondence relationship, the same display start timings as the operation timings are set, it would also be acceptable for the display start timings not to be the same as the operation timings. Provided that it is possible to make an effect of continuity between the objects O, for example, it would also be acceptable for a timing that is earlier than the operation timing corresponding to an object O that arrives at an appearance position to be set as the display start timing corresponding to the operation timing that functions as the appearance position. Moreover, between the operation timings that have the correspondence relationship, it would also be acceptable for no operation timing that functions as an appearance position necessarily to exist. An object O that corresponds to an operation timing for which no operation timing exists that functions as an appearance position may be eliminated from the game region 30, as something that provides no continuity.

Next, processing executed by the game control unit 11 when the music game is performed upon the game machine 1 will be described. After the game control unit 11 has read in the game program 21 and has completed the initial settings required for performing the music game, the game control unit 11 waits for a game start command to be provided from the player. The game start command may, for example, include operation for specifying data to be used in the game, such as for selecting music to be played in the game, or for selecting the difficulty level. The procedure for receiving such commands may be the same as that used in a well-known game.

Figure 8:
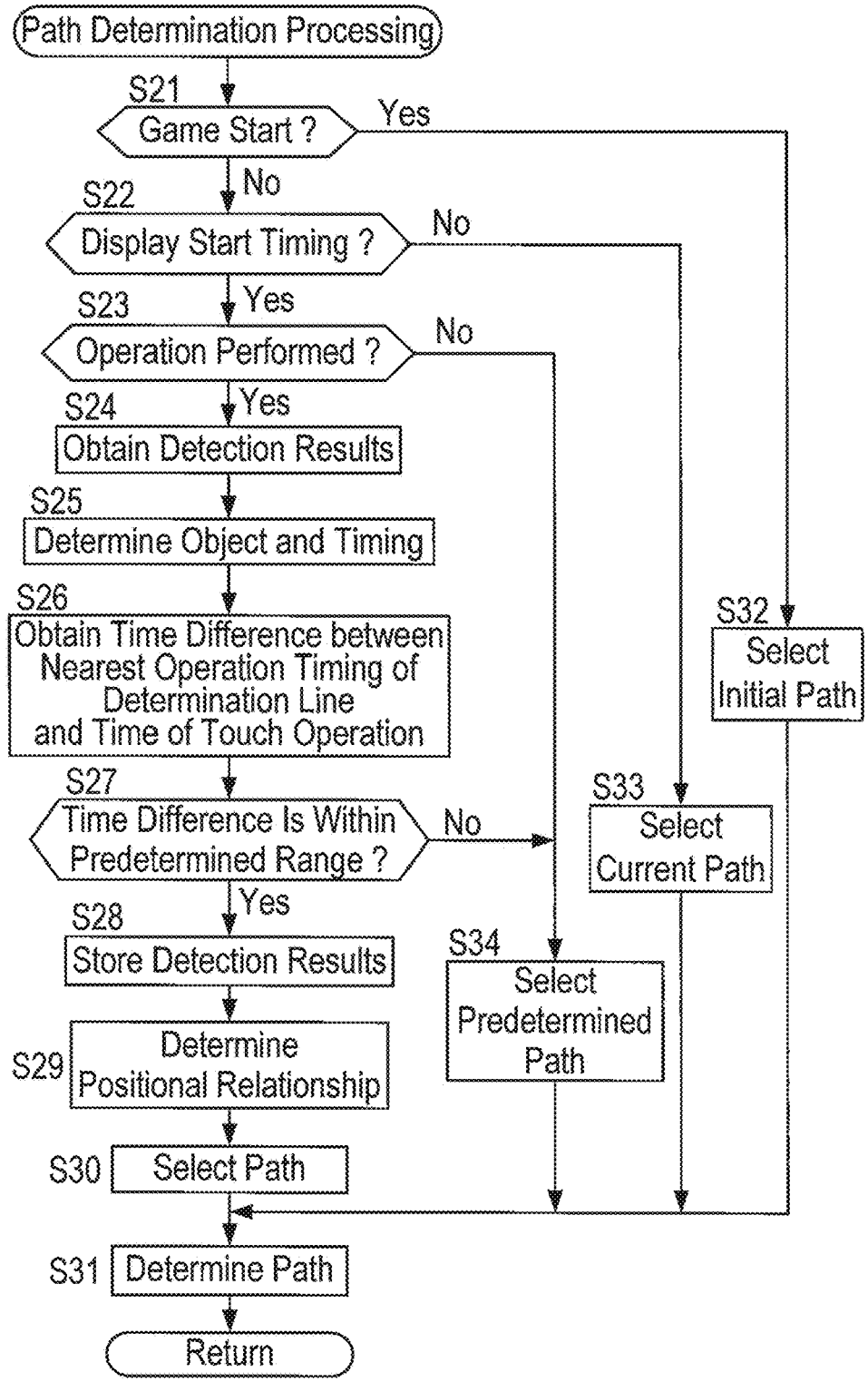
FIG. 8 is a flowchart showing a path determination processing routine executed by the game machine.
Figure 9:
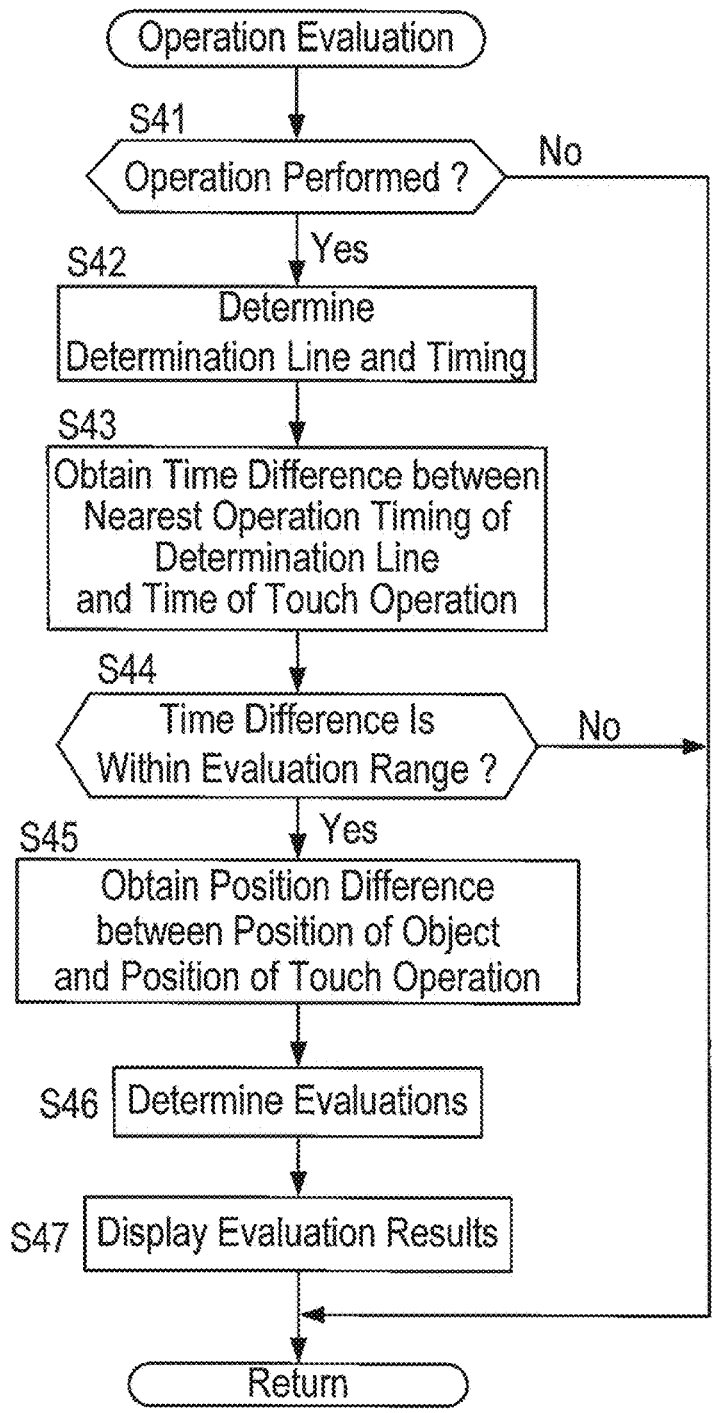
FIG. 9 is a flowchart showing an operation evaluation routine executed by the game machine.

When a command for starting the game is issued, by reading in the music data 24 corresponding to the music that has been selected by the player and outputting this music data 24 to the audio output control unit 13, the game control unit 11 starts reproduction of music from the speaker 5. By doing this, the control unit 10 functions as a music reproduction device. Moreover, in synchrony with the reproduction of the music, the game control unit 11 causes the game region 30 and the information region 31 to be displayed upon the monitor 2, by reading in the sequence data 23 corresponding to the selection by the player, by generating the image data required for drawing the game region 30 and the information regions 31 while referring to the image data 26, and by outputting this image data to the display control unit 12. Furthermore, during execution of the music game, as processing that are required for displaying the game region 30 and so on, the game control unit 11 repeatedly executes, on a predetermined cycle, each of a sequence processing routine shown in FIG. 7, a path determination processing routine shown in FIG. 8, and an operation evaluation routine shown in FIG. 9. The routines of FIG. 7 and FIG. 8 are handled by the sequence processing unit 14, while the operation evaluation routine of FIG. 9 is handled by the operation evaluation unit 15.

Figure 7:
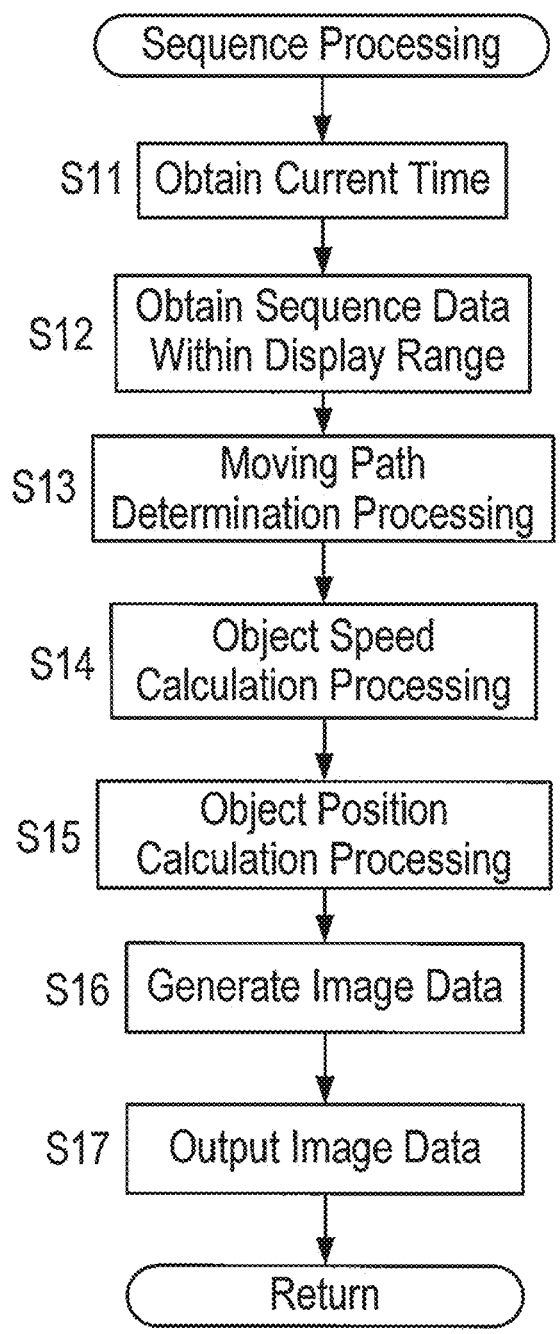
FIG. 7 is a flowchart showing a sequence processing routine executed by the game machine.

FIG. 7 shows an example of a flowchart of the sequence processing routine executed by the sequence processing unit 14. When the routine of FIG. 7 is started, the sequence processing unit 14 of the game control unit 11 first obtains a current time in the music in a step S11. For example, clocking is started, by an internal clock of the game control unit 11, and the current time is obtained from a value of the internal clock, based on a reproduction start point time of the music. In the next step S12, the sequence processing unit 14 obtains, from the sequence data 23, data for objects O for which the display start timing and the operational timing are present within a time length corresponding to a display range of the game region 30. As one example, the display range may be set to a time range corresponding to about two bars of the music from the current time toward the future.

In the next step S13, the sequence processing unit 14 determines the paths W for the all objects O to be displayed. This determination may, as one example, be implemented by a routine of FIG. 8 being executed. FIG. 8 shows an example of a flowchart for the path determination processing routine that is executed by the sequence processing unit 14. When the routine of FIG. 8 starts, in a step S21, the sequence processing unit 14 first determines whether or not this is the time of starting of the game. When the determination in the step S21 is affirmative, the sequence processing unit 14 goes to a step S32. On the other hand, when the determination in the step S21 is negative, the sequence processing unit 14 goes to a step S22. In the step S32, the sequence processing unit 14 selects a path that has been set in advance as the path for display of the object O, and then the sequence processing unit 14 goes to a step S31. As one example, the path W3 that extends from the rebounding point R1 that is included in the first determination line La and that is positioned an n-th from the left side may be set as the path that is set in advance.

On the other hand, in the step S22, the sequence processing unit 14 determines whether or not a display of the object O is to be displayed at the display start timing. When the determination in the step S22 is negative, in other wards when it is determined that a display of the object O is not to a display at the display start timing and a path to be displayed has been already selected, the sequence processing unit 14 goes to a step S33. In the step S33, the sequence processing unit 14 selects the path that is already selected as the path to be displayed, in other words a current path. Then, the sequence processing unit 14 goes to the step S31.

On the other hand, when the determination in the step S22 is affirmative, in other words when it is determined that a display of the object O is a display at the display start timing, and the path to be displayed is not selected, the sequence processing unit 14 goes to a step S23. In the step S23, the sequence processing unit 14 determines whether or not the touch operation upon the object O is being performed with reference to an output signal of the touch panel 3. When the determination in the step S23 is negative, the sequence processing unit 14 goes to a step S34. On the other hand, when the determination in the step S23 is affirmative, the sequence processing unit 14 goes to a step S24. In the step S34, the sequence processing unit 14 selects a predetermined path as the path upon which the object O is to be displayed, and goes to the step S31. For example, the selection of the predetermined path in the step S34 may be implemented such that a path adjacent to a path on which the object O corresponding to the object O that starts to displayed, in other words the object O that has immediately previously arrived at the rebounding point R1 or R2 used as the appearance position of the object O that starts to be displayed has been displayed, or a path which is at the shortest distance from the appearance position toward the determination line La or Lb to arrive is set as the predetermined path.

On the other hand, in the step S24, the sequence processing unit 14 obtains detection results by the detection unit 4. When the game machine 1 is tilted with respect to the horizontal plane of the game screen GS due to the operation of the player, the detection unit 4 detects a direction through which it is tilted (i.e. a tilt direction) and an angle through which it is tilted (i.e. a tilt angle) by detecting acceleration in three directions, for example with a three-axis acceleration sensor. In this processing, the tilt direction and the tilt angle are obtained. In the next step S25, on the basis of the signal outputted from the touch panel 3, the sequence processing unit 14 determines a determination line L upon which touch operation has been performed and a timing (i.e. a time in the music) at which the touch operation has been performed. In the next step S26, the sequence processing unit 14 specifies a nearest operation timing described in the sequence data 23 with respect to the determination line L upon which the touch operation was performed, in other words an operation timing which is closest in time and associated in the sequence data 23 with respect to the determination line upon which the touch operation was performed, and obtains a time difference between this operation timing and a time at which the touch operation was performed.

In the next step S27, by determining whether or not the time difference is within a predetermined range, the sequence processing unit 14 determines whether or not the operation by the player is appropriate. The predetermined range is set to a predetermined time range around an operation timing of a comparison target. When the determination in the step S27 is negative, the sequence processing unit 14 goes to the step S34, and, as described above, selects the predetermined path as the path upon which the object O is to be displayed. Then, the sequence processing unit 14 goes to the step S31. On the other hand, when the determination in the step S27 is affirmative, the sequence processing unit 14 goes to a step S28.

In the next step S28, the sequence processing unit 14 stores the detection results by the detection unit 4 that have been obtained, in other words the tilt direction and the tilt angle, in the internal storage (for example, RAM). In the next step S29, on the basis of the signal outputted from the touch panel 3, the sequence processing unit 14 determines the positional relationship between the operation position upon the determination line La or Lb at which touch operation has been performed and the position of the object O. Specifically, the sequence processing unit 14 distinguishes whether the position at which touch operation has been performed is any one of the vicinity of the contact region S, the vicinity of the right side region R, the vicinity of the left side region L, and the vicinity of the remaining region of the object O for which display has been started or the object O that has most recently arrived at the appearance position. In the next step S30, according to the positional relationship that was determined in the step S29, the sequence processing unit 14 selects the path upon which the object O is to be arranged. This selection of a path may, as one example, be performed as follows. First, any one of the right side region R, the left side region L, the contact region S, and the remaining region is allocated to each path W. Next, on the basis of the result of determination in the step S29, a path, that is allocated to the position at which the touch operation was performed, is selected from among the plurality of paths W that extend from the appearance position. In the example of FIG. 3, for the rebounding point R1, the straight line path W2 is allocated to the contact region S and to the remaining region; the right side path W3 is allocated to the left side region L; and the left side path W1 is allocated to the right side region R. And, the straight line path W2 is selected when the touch operation has been performed in the vicinity of the contact region S of the object O or of the remaining region; the left side path W1 is selected when the touch operation has been performed in the vicinity of the right side region R; and the right side path W3 is selected when the touch operation has been performed in the vicinity of the left side region L.

In the next step S31, the sequence processing unit 14 decides the path that was selected in the steps S30 or the steps S32 through S34 as the path upon which the object O is to be displayed, and then ends the current routine.

Returning to the routine of FIG. 7, in a step S14, the sequence processing unit 14 executes object speed calculation processing. In this processing, the moving speeds of all of the objects O in the game region 30 that are to be displayed upon the paths W are calculated. This calculation is performed by using the calculation method for moving speed described above, for example on the basis of the tilt direction and the tilt angle that are stored in the internal storage of the sequence processing unit 14, and the time difference between the operation timing and current time. In a case that the game is being played between two players upon a single game machine, in the step S24 described above, the detection results by the detection unit 4 when each of the players has performed touch operation are obtained, and, in the step S28, the tilt direction and the tilt angle for each of the players are stored. And, for an object O that is moving from the first determination line La toward the second determination line Lb, the moving speed of the object O is calculated on the basis of the tilt direction and of the tilt angle when the first player has performed the touch operation. On the other hand, for an object O that is moving from the second determination line Lb toward the first determination line La, the moving speed of the object O is calculated on the basis of the tilt direction and of the tilt angle when the second player has performed the touch operation. Due to this, tilting of the game machine when each of the players is performing operation is reflected in the object O which that player has bounced back.

In the next step S15, the sequence processing unit 14 executes object position calculation processing. In the object position calculation processing, the coordinates in the game region 30 of all of the objects O that are to be displayed upon the paths W are calculated. For example, this calculation may be performed as follows. First, on the basis of the result of the processing in the step S13, the path W to display each object O included in the display range is determined. Next, according to the moving direction corresponding to each of the objects O (i.e. according to which one of the determination lines La and Lb it will arrive at) and the moving speed of each of the objects O, the position of each of the objects O from the determination line La or Lb in the time axis direction (in other words, the moving direction of the object O) is determined. Consequently, it is possible to obtain the path W upon which each of the objects O is to be arranged, and the coordinates of each of the objects O that are required in order to arrange each of the objects O upon this path W along the time axis from the determination line La or Lb.

In the next step S16, on the basis of the moving speed of the object O and the coordinate of the object O calculated in the step S15, the sequence processing unit 14 generates image data required for drawing the game region 30. Specifically, the sequence processing unit 14 generates image data so that the objects O can be arranged at the calculated coordinates. An image of the object O and so on may be obtained from the image data 26. In the next step S17, the sequence processing unit 14 outputs the image data to the display control unit 12. Due to this, the game region 30 is displayed upon the monitor 2. When the processing of the step S17 has been completed, the sequence processing unit 14 ends the current sequence processing routine.

Next, the operation evaluation routine of FIG. 9 will be described. When the operation evaluation routine of FIG. 9 is started, in a step S41, the operation evaluation unit 15 first determines whether or not the touch operation upon the object O is taking place with reference to the output signal of the touch panel 3. At this time, when any position other than the determination lines La and Lb is being touched, it is determined that no touch operation is taking place. When it is determined that no touch operation is taking place, the operation evaluation unit 15 ends the current routine. On the other hand, when it is determined that the touch operation is taking place, the operation evaluation unit 15 goes to a step S42. In the step S42, on the basis of a position signal outputted from the touch panel 3, the operation evaluation unit 15 determines the timing (i.e. a time in the music) at which the touch operation has been performed. In the next step S43, the operation evaluation unit 15 specifies a nearest operation timing described in the sequence data 23 with respect to the determination line upon which the touch operation was performed, in other words an operation timing which is closest in time and associated in the sequence data 23 with respect to the determination line upon which the touch operation was performed, and obtains a time difference between this operation timing and a time at which the touch operation was performed.

In the next step S44, by determining whether or not the time difference is within an evaluation range, the operation evaluation unit 15 determines whether or not the operation by the player is appropriate. The evaluation range is set to a predetermined time range around an operation timing of a comparison target. As one example, a plurality of steps of levels may be set centering on an operation timing, and a time range in which the levels are set may be treated as the evaluation range. When it is determined in the step S44 that the time difference is outside the evaluation range, the operation evaluation unit 15 ends the current routine. On the other hand, when it is determined that the time difference is within the evaluation range, the operation evaluation unit 15 goes to a step S45. In the step S45, the operation evaluation unit 15 specifies an operation position at which the touch operation has been performed on the determination line La or Lb and an operation timing which is closest in time in the sequence data 23 with respect to the determination line at which the touch operation has been performed, and obtains a position difference between the operation position and the arrival position of the object O indicating the operation timing.

In the next step S46, on the basis of the time difference that was obtained in the step S43 and of the position difference that was obtained in the step S45, the operation evaluation unit 15 determines evaluations for the touch operation by the player. For example, these evaluations may be performed as follows. First, in relation to the time difference, an evaluation is implemented by determining whether or not a timing of the touch operation belongs to any one of a plurality of levels are set within the time range. The plurality of levels are set so that the time range is divided in units of predetermined time period, and the touch operation that belongs to a division close to an operation timing of each division is evaluated high. Moreover, in relation to the position difference, an evaluation is implemented by comparing the position of the center of the object O and the position of the touch operation. For example, in the evaluation of the position difference, a region up to twice the diameter of the object O is evaluated as "GOOD", and the remaining region is evaluated as "MISS". Alternatively, the inner side further than the outer circumference of the object O is evaluated highest, a predetermined evaluation range is set such that an evaluation is steadily lowered in units of certain distances from the outer circumference, and the evaluation is determined according to the evaluation range to which the position of the touch operation belongs to. Thereafter, the operation evaluation unit 15 goes to a step S47, and controls output to the display control unit 12 so that the results of evaluation are displayed in at least one of the game region 30 and the information region 31. When the processing of the step S47 has been completed, the operation evaluation unit 15 ends the current routine. In addition, in the example of FIG. 9, the step of obtaining the difference between the position of the object and the position of the touch operation may be executed before the step of obtaining the difference between the operation timing nearest to the determination line and the time at which the touch operation has been performed. Moreover, in the example of FIG. 9, the evaluation of the position difference is performed such that "GOOD" or "MISS" is evaluated according to a region. However, when the position difference is outside a predetermined range, similarly to the step S44, the subsequent processing may be skipped, and then the current routine may end. In this case, for example, when an operation on the first determination line La is required, an operation on an inappropriate position outside a predetermined range such as an operation performed on the second determination line Lb can be excluded from an evaluation target.

As described above, according to the present invention, tilting of the game machine 1 when the player has performed the touch operation is reflected in the moving speed of the object O. Thereby, it is possible to make it seem as though gravity is acting upon the object O. Moreover, since the moving speed of the object O is varied with the tilting of the game machine 1 in this manner, it is possible to endow the movement of the object O with variety. Accordingly, it is possible to enhance the interest of the game.

In the present invention, for example, even though the object O is accelerated in the first section W1$a$, the object O is decelerated in the second section W1$b$, so that this object O arrives at the predetermined determination line L at the operational timing that was set in advance. Thereby, it is possible to prevent the object O from arriving at the determination line L at a timing that is outside the tempo of the music. Accordingly, it is possible to vary the speed of the object O without imparting any sense of operational discomfort to the player.

In the embodiment described above, by executing the processing of the step S13, the game control unit 11 functions as a path setting device of the present invention. Moreover, by executing the processing of the step S14, the game control unit 11 functions as a speed setting device and as an adjustment device of the present invention. Furthermore, by executing the steps S16 and S17, the game control unit 11 functions as a control device of the present invention.

The present invention is not limited to the above-described embodiments, and various modifications of the present invention may be provided. For example, in the embodiment described above, the monitor 2, the touch panel 3, and the detection unit 4 of the game machine 1 were provided within the same body, but it is not limited. For example, the game machine 1 may include a controller that has various operation buttons and contains the detection unit 4. And, by changing a relative position of the controller while operating the operation buttons as substitute for the touch operation by the touch panel 3, the game region A displayed upon a monitor that is separate from the controller may be rotated. In this case, the controller would function as the operating unit.

Furthermore, the present invention may also be applied to a game system in which two game machines are connected together by wireless or by a cable, and in which a first player can play the game using one of the game machines while a second player can play the same game using the other game machine.

In the embodiment described above, the sections of the path were separated by the left side wall 30L or the right side wall 30R of the game screen GS, the method for separating these sections is not limited to this method. In the present invention, the sections may be separated at any desired spots on the moving path of the object O, as appropriate. Moreover, the number of sections provided upon the moving path is not limited to being two. Three or more sections may be provided upon the moving path, and the object O may be accelerated or decelerated in each of those sections. However, in this case as well, if the object O is accelerated or decelerated in one section among those sections, then the moving speed of the object O should be adjusted in the remaining sections, so that the object O arrives at the predetermined determination line at the operation timing.

In the present invention, a tilt gauge, that counts the number of times that the game machine 1 is tilted, may be provided. And, when the number counted by the tilt gauge becomes higher than a determination value that is set in advance, the number of beats per minute (Beats Per Minute, BPM) of the music that is being played in the game may be increased or decreased. In this case, the moving speed of the object O should also be appropriately adjusted to match the BPM after this change.

In the embodiment described above, the tilting of the game machine 1 in the left/right direction (the transverse direction in FIG. 3) was reflected in the movement of the object O. Tilting of the game machine 1 in the front/rear direction (the vertical direction in FIG. 3) may be reflected in the movement of the object O. In other words, when one of the players is at the lower side in FIG. 3, tilting of the game machine 1 in a direction of a closer side and a farther side of the player may be reflected in the movement of the object O. In this case, a changeover line CL (refer to FIG. 10) for changing over between acceleration and deceleration of the object O should be provided at an appropriate position between the first determination line La and the second determination line Lb, for example at a middle position between these determination lines or the like. The changeover line is not displayed upon the game screen GS. And, when the game machine 1 is tilted in the front/rear direction, this tilting is reflected in the movement of the object O. In the following, this method will be described in detail with reference to FIG. 10 and FIG. 11. In these figures, the same components as those in FIG. 3 or FIG. 5 are denoted by the same reference numerals, and descriptions thereof will be omitted.

Figure 10:
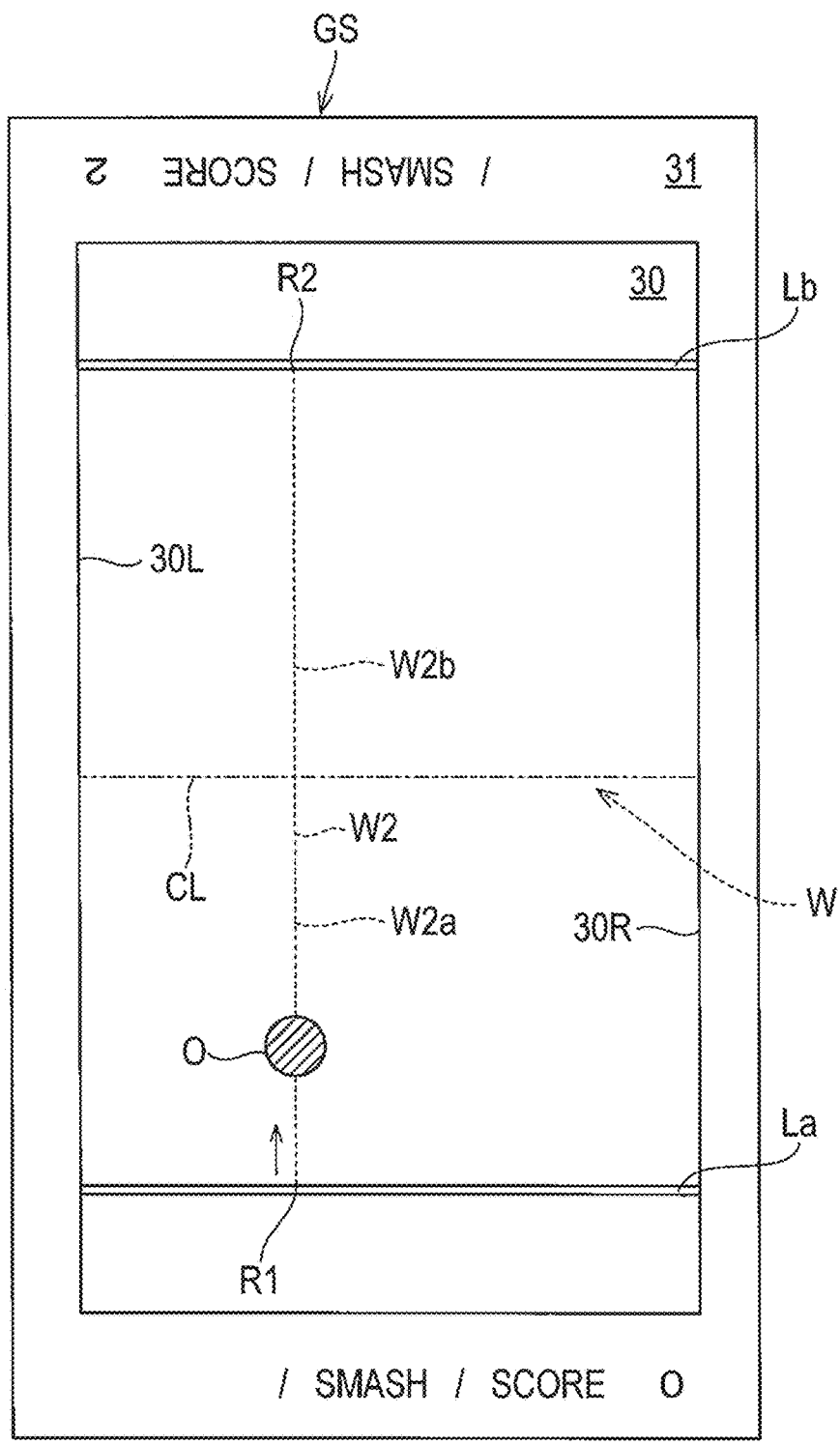
FIG. 10 is another diagram schematically showing the game screen.
Figure 11:
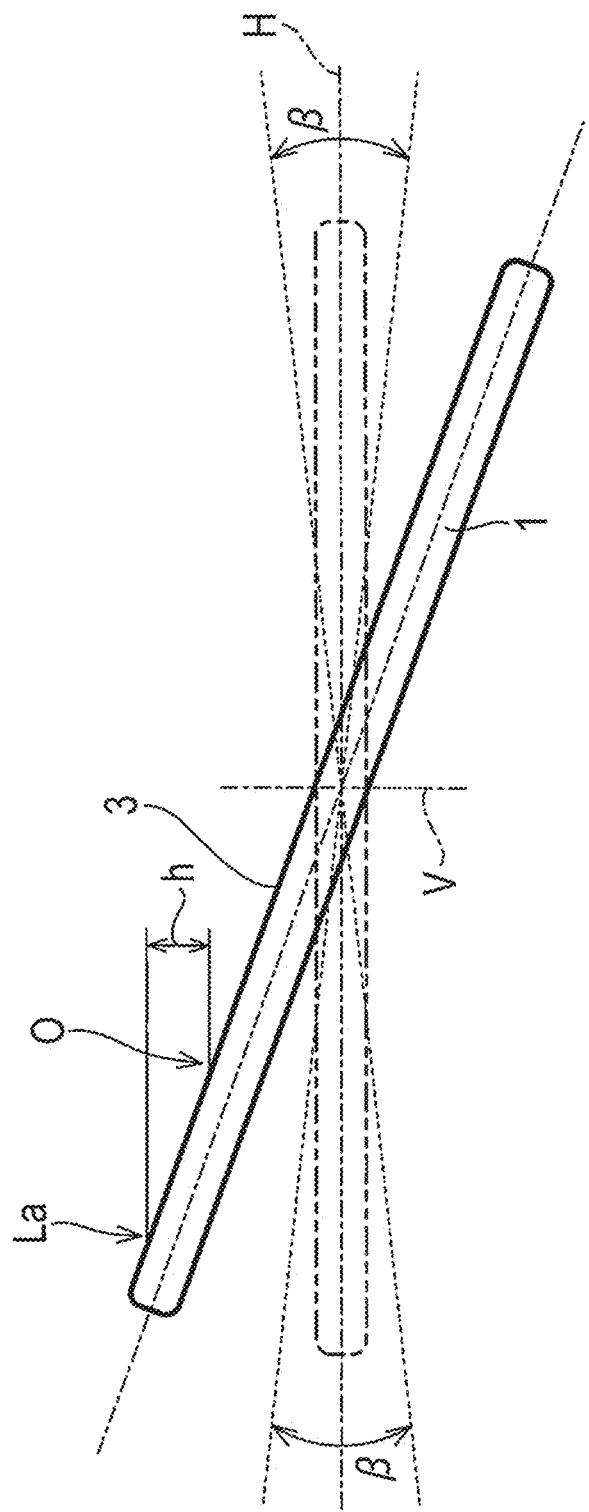
FIG. 11 is a diagram for description of tilting of the game machine in the front/rear direction.

FIG. 10 is a diagram schematically showing the game screen GS, in a similar manner to FIG. 3. In this figure, as the moving path, only the path W2 is shown. FIG. 11 is a diagram showing the game machine 1 viewed from the direction of the arrow XI in FIG. 1. Thereby, the left side in this figure corresponds to the lower side in FIG. 10, while the right side in this figure corresponds to the upper side in FIG. 10. In this figure, the game machine 1 is shown by alternate long and two short dashes lines in its state in which it is parallel to the horizontal plane H (i.e. in the horizontal state). In this case as well, even though the game machine 1 is tilted from its horizontal state in the front/rear direction, if this tilting is within a permitted range β shown in this figure, then this tilting of the game machine 1 is not reflected in the moving speed of the object O. In this case, in a similar manner to the case with the embodiment described above, the object O moves upon a moving path that has been determined from one of the determination lines toward the other determination line at the standard speed.

On the other hand, as shown in the example of FIG. 11, when the game machine 1 is tilted through the permitted range β or greater, this tilting of the game machine 1 is reflected in the moving speed of the object O. Specifically, a case will be described in which the moving path is determined to be the path W2, and moreover, when the player performs the touch operation, the game machine 1 is tilted to a state in which, as shown in this figure, the closer side of the game screen GS (its lower side in FIG. 10) is positioned higher than its further side (its upper side in FIG. 10). In this case, the moving path W2 is divided into a first section W2a from the first determination line La to the changeover line CL, and a second section W2b from the changeover line CL to the second determination line Lb. And, the speed of the object O in each of these sections is set so that the object O accelerates in the first section W2a and the object O decelerates in the second section W2b.

In this case, an angle through which the game machine 1 has been tilted is obtained from the detection results by the detection unit 4. Thereafter, on the basis of this angle, height h (refer to FIG. 11), that is actually created by the game machine 1 between the object O at each position within the first section W2a and the first determination line La, is calculated. An added speed, that is to be added to the standard speed at each position at which the object O moves within the first section W2a, is calculated from a well-known formula for obtaining fall velocity on the basis of the height h obtained from the angle of the game machine 1 and the acceleration of gravity. And, a value that is obtained by adding the added speed calculated in this manner to the standard speed is set as the moving speed of the object O at each position within the first section W2a.

In a similar manner to the case with the embodiment described above, even though the tilting of the game machine 1 in the front/rear direction is reflected in the movement of the object O, still the timings at which the object O is to arrive at the determination lines La and Lb (i.e. the operation timings) are set in advance. Thus, the moving speed of the object O in the second section W2b is set so that the object O, which was accelerated in the first section W2a, arrives at the second determination line Lb at the operation timing that has been set in advance. Thus, the object O moves through the second section W2b while decelerating. It would be acceptable to arrange for the deceleration at this time to be set so that the object O decelerates at a constant rate from the changeover line CL to the second determination line Lb; or, alternatively, it would also be acceptable to arrange for the deceleration to be set so that it becomes greater as the object O approaches the second determination line Lb. By doing this, the object O arrives at the second determination line Lb at the operation timing that has been set in advance. And, by reflecting the tilting of the game machine 1 in the front/rear direction in the movement of the object O in this manner, it is possible to make it seem as though the object O is descending a slope from the first determination line La to the changeover line CL, while it seems as though the object O is ascending a slope from the changeover line CL to the second determination line Lb.

If the game machine 1 is tilted to a state that is opposite to the state shown in FIG. 11, in other words if the game machine 1 is tilted to a state in which the closer side of the game screen GS (its lower side in FIG. 10) is positioned lower than its further side (its upper side in FIG. 10), then the speed of the object O in each of the sections should be set so that the object O decelerates in the first section W2a and the object O accelerates in the second section W2b. In this case, an angle through which the game machine 1 has been tilted is obtained from the detection results by the detection unit 4. And, on the basis of this angle, height h is calculated that is actually created by the game machine 1 between the object O at each position within the first section W2a and the first determination line La. Thereafter, a reduction speed that is to be subtracted from the standard speed at each position within the first section W2a is calculated on the basis of this height h and the acceleration of gravity. And, a value that is obtained by subtracting the reduction speed from the standard speed is set as the moving speed of the object O at each position within the first section W2a.

In this case, the moving speed of the object O in the second section W2b is set so that the object O, which was decelerated in the first section W2a, arrives at the second determination line Lb at the operation timing that has been set in advance. And, the object O moves through the second section W2b while accelerating. It would be acceptable to arrange for the acceleration at this time to be set so that the object O accelerates at a constant speed from the changeover line CL to the second determination line Lb; or, alternatively, it would also be acceptable to arrange for the acceleration to be set so that it becomes greater as the object approaches the second determination line Lb. In this case, it is possible to make it seem as though the object O is ascending a slope from the first determination line La to the changeover line CL, while it seems as though the object O is descending a slope from the changeover line CL to the second determination line Lb.

By reflecting the tilting of the game machine 1 in the front/rear direction in the movement of the object O in this manner, it is possible to make it seem as though gravity is acting upon the object O. Moreover, since due to this it is possible to endow the movement of the object O with variety, accordingly it is possible to enhance the interest of the game. And, since even though the moving speed changes in this manner, the object O still arrives at the predetermined determination line L at the operation timing that has been set in advance, accordingly it is possible to prevent the object O from arriving at the determination line L at a timing that is different from the tempo of the music. Due to this, it is possible to change the speed of the object O without imparting any sense of discomfort to the player.

The position at which the changeover line CL is set is not limited to being at the middle between the first determination line La and the second determination line Lb. The changeover line CL may be set to any appropriate position between the first determination line La and the second determination line Lb. Moreover, instead of providing the changeover line CL, it would also be acceptable to provide an acceleration or deceleration zone before the determination line at which the object O is to arrive. This acceleration or deceleration zone is provided so as to be overlapped over the moving path. In this acceleration or deceleration zone, the object O is decelerated if the object O was accelerated until it arrived at this zone, while the object O is accelerated if the object O was decelerated until it arrived at this zone. In other words, the moving speed of the object O is adjusted by this acceleration or deceleration zone so that the object O arrives at the predetermined determination line at the operation timing. In this case, a section from one of the determination lines until the acceleration or deceleration zone is entered becomes the first section, while a section within the acceleration or deceleration zone becomes the second section.

In the description described above, the moving speed of the object O is set by using the tilting of the game device 1 in the left/right direction and its tilting in the front/rear direction separately, it would also be acceptable, in the present invention, to arrange for the moving speed of the object O to be set by using both this tilting in the left/right direction and this tilting in the front/rear direction. In this case, it would be possible to set the moving speed of the object O by using an appropriate combination of the above described methods of setting the moving speed.

In the present invention, the method for obtaining the moving speed of the object O is not limited to the method described above. Moreover, acceleration that is employed when calculating the added speed or the reduction speed is not limited to being the acceleration of gravity. The acceleration that is employed in these calculations may be set as appropriate. Moreover, if the movement speed in the first section is set on the basis of the detection results by the detection unit 4, then it will be acceptable for it to be set using any appropriate setting method. For example, while in the description described above the moving speed is set so that gravity appears to act upon the object O, conversely to the above, it would also be acceptable to arrange to set the moving speed so that the object O appears to move against gravity. For example, it would be possible to arrange, when the game machine 1 is tilted so that the left side of the game screen GS is positioned lower than its right side as shown in FIG. 5, to set the moving speed so that the object O decelerates when the object O moves in the game screen GS from the left side toward the right side. In this case, the object O will be made to accelerate in the second section, so that the object O arrives at the determination line L at the operation timing.

In the embodiment described above, the permitted ranges α and β for tilting of the game machine 1 not to be reflected in the game are set, it would also be acceptable not to set such permitted ranges.

The game system of the present invention includes a game machine comprising a display unit that displays a game screen and an operating unit that is operated by a player, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent; wherein the game machine has a tilt detection device that detects tilting of the game machine with respect to the horizontal plane, and the game system comprises: a path setting device configured to, when the operation indication mark arrives at the first reference portion and the operating unit is operated by the player, set a moving path which is a path along which the operation indication mark is to move from the first reference portion until arriving at the second reference portion; a speed setting device configured to obtain tilting of the game machine detected by the tilt detection device when the operation indication mark arrives at the first reference portion and the operating unit is operated by the player, and to set a moving speed of the operation indication mark in a partial section of the moving path on the basis of the tilting of the game machine that is obtained; an adjustment device configured to set a moving speed of the operation indication mark in a remaining section, which is the section of the moving path other than the partial section, on the basis of the moving speed of the operation indication mark in the partial section that is set by the speed setting device, so that the operation indication mark moves from the first reference portion to the second reference portion in a setting time; and a control device configured to control the operation indication mark so that the operation indication mark moves at the moving speed set by the speed setting device in the partial section, and so that the operation indication mark moves at the moving speed set by the adjustment device in the remaining section.

In one embodiment of the game system of the present invention, in the game, while music is being reproduced, the operation indication mark may arrive at least at one of the first reference portion and the second reference portion in time with the music; and the setting time may be set on the basis of a tempo of the music.

In one embodiment of the game system of the present invention, the speed setting device may set the moving speed of the operation indication mark on the basis of the tilting of the game machine and of the acceleration of gravity.

In one embodiment of the game system of the present invention, the tilt detection device may detect magnitude of tilting of the display unit with respect to the horizontal plane when the game machine is tilted; and the speed setting device may set the moving speed of the operation indication mark to a value obtained by dividing distance of the moving path by the setting time, in a case that the magnitude of the tilting of the display unit with respect to the horizontal plane as detected by the tilt detection device is within a permitted range which is set in advance when the operation indication mark arrives at the first reference portion and the operating unit is operated by the player.

In this embodiment, the speed setting device may make the moving speed of the operation indication mark be higher as the magnitude of the tilting of the display unit with respect to the horizontal plane is larger, in a case that the magnitude of the tilting of the display unit with respect to the horizontal plane as detected by the tilt detection device is greater than the permitted range when the operation indication mark arrives at the first reference portion and the operating unit is operated by the player.

The control method of the present invention is a control method for controlling a computer incorporated into a game system, the game system that includes a game machine comprising: a display unit that displays a game screen; an operating unit that is operated by a player; and a tilt detection device that detects tilting of the game machine with respect to the horizontal plane, and providing a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the control method making the computer execute the steps including: a path setting step of, when the operation indication mark arrives at the first reference portion and the operating unit is operated by the player, setting a moving path which is a path along which the operation indication mark is to move from the first reference portion until arriving at the second reference portion; a speed setting step of obtaining tilting of the game machine detected by the tilt detection device when the operation indication mark arrives at the first reference portion and the operating unit is operated by the player, and of setting a moving speed of the operation indication mark in a partial section of the moving path on the basis of the tilting of the game machine that is obtained; an adjustment step of setting a moving speed of the operation indication mark in a remaining section, which is the section of the moving path other than the partial section, on the basis of the moving speed of the operation indication mark in the partial section that is set in the speed setting step, so that the operation indication mark moves from the first reference portion to the second reference portion in a setting time; and a control step of controlling the operation indication mark so that the operation indication mark moves at the moving speed set in the speed setting step in the partial section, and so that the operation indication mark moves at the moving speed set in the adjustment step in the remaining section.

The non-transitory computer readable medium of the present invention is a non-transitory computer readable storage medium storing a computer program for a game system that includes a game machine comprising: a display unit that displays a game screen; an operating unit that is operated by a player; and a tilt detection device that detects tilting of the game machine with respect to the horizontal plane, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the computer program making a computer incorporated into the game system function as: a path setting device configured to, when the operation indication mark arrives at the first reference portion and the operating unit is operated by the player, set a moving path which is a path along which the operation indication mark is to move from the first reference portion until arriving at the second reference portion; a speed setting device configured to obtain tilting of the game machine detected by the tilt detection device when the operation indication mark arrives at the first reference portion and the operating unit is operated by the player, and to set a moving speed of the operation indication mark in a partial section of the moving path on the basis of the tilting of the game machine that is obtained; an adjustment device configured to set a moving speed of the operation indication mark in a remaining section, which is the section of the moving path other than the partial section, on the basis of the moving speed of the operation indication mark in the partial section that is set by the speed setting device, so that the operation indication mark moves from the first reference portion to the second reference portion in a setting time; and a control device configured to control the operation indication mark so that the operation indication mark moves at the moving speed set by the speed setting device in the partial section, and so that the operation indication mark moves at the moving speed set by the adjustment device in the remaining section.

What is claimed is:

1. A game system that includes a game machine comprising a display unit that displays a game screen and an operating unit that is operated by a player, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent; wherein the game machine has a tilt detection device that detects tilting of the game machine with respect to the horizontal plane, and the game system comprises:

a path setting device configured to, when the operation indication mark arrives at the first reference portion and the operating unit is operated by the player, set a moving path which is a path along which the operation indication mark is to move from the first reference portion until arriving at the second reference portion, the moving path including a partial section and a remaining section;

a speed setting device configured to obtain tilting of the game machine detected by the tilt detection device when the operation indication mark arrives at the first reference portion and the operating unit is operated by the player, and to set a first moving speed on the basis of the tilting of the game machine that is obtained, the first moving speed being associated with the partial section;

an adjustment device configured to set a second moving speed on the basis of a setting time and the first moving speed, the setting time being set in advance as a total time that the operation indication mark spends moving between the first and second reference portions; and a control device configured to control the operation indication mark so that the operation indication mark moves at the first moving speed set by the speed setting device in the partial section, and so that the operation indication mark moves at the second moving speed set by the adjustment device in the remaining section, wherein the operation indication mark spends a first moving time moving along the partial section at the first moving speed and a second moving time moving along the remaining section at the second moving speed, wherein the sum of the first and second moving times is equal to the setting time.

2. The game system according to claim 1, wherein:
in the game, while music is being reproduced, the operation indication mark arrives at least at one of the first reference portion and the second reference portion in time with the music; and
the setting time is set on the basis of a tempo of the music.

3. The game system according to claim 2, wherein
the speed setting device sets the moving speed of the operation indication mark on the basis of the tilting of the game machine and of the acceleration of gravity.

4. The game system according to any one of claim 3, wherein:
the tilt detection device detects magnitude of tilting of the display unit with respect to the horizontal plane when the game machine is tilted; and
the speed setting device sets the moving speed of the operation indication mark to a value obtained by dividing distance of the moving path by the setting time, in a case that the magnitude of the tilting of the display unit with respect to the horizontal plane as detected by the tilt detection device is within a permitted range which is set in advance when the operation indication mark arrives at the first reference portion and the operating unit is operated by the player.

5. The game system according to claim 4, wherein
the speed setting device makes the moving speed of the operation indication mark be higher as the magnitude of the tilting of the display unit with respect to the horizontal plane is larger, in a case that the magnitude of the tilting of the display unit with respect to the horizontal plane as detected by the tilt detection device is greater than the permitted range when the operation indication mark arrives at the first reference portion and the operating unit is operated by the player.

6. The game system according to any one of claim 2, wherein:
the tilt detection device detects magnitude of tilting of the display unit with respect to the horizontal plane when the game machine is tilted; and
the speed setting device sets the moving speed of the operation indication mark to a value obtained by dividing distance of the moving path by the setting time, in a case that the magnitude of the tilting of the display unit with respect to the horizontal plane as detected by the tilt detection device is within a permitted range which is set in advance when the operation indication mark arrives at the first reference portion and the operating unit is operated by the player.

7. The game system according to claim 6, wherein
the speed setting device makes the moving speed of the operation indication mark be higher as the magnitude of the tilting of the display unit with respect to the horizontal plane is larger, in a case that the magnitude of the tilting of the display unit with respect to the horizontal plane as detected by the tilt detection device is greater than the permitted range when the operation indication mark arrives at the first reference portion and the operating unit is operated by the player.

8. The game system according to claim 1, wherein
the speed setting device sets the moving speed of the operation indication mark on the basis of the tilting of the game machine and of the acceleration of gravity.

9. The game system according to any one of claim 8, wherein:
the tilt detection device detects magnitude of tilting of the display unit with respect to the horizontal plane when the game machine is tilted; and
the speed setting device sets the moving speed of the operation indication mark to a value obtained by dividing distance of the moving path by the setting time, in a case that the magnitude of the tilting of the display unit with respect to the horizontal plane as detected by the tilt detection device is within a permitted range which is set in advance when the operation indication mark arrives at the first reference portion and the operating unit is operated by the player.

10. The game system according to claim 9, wherein
the speed setting device makes the moving speed of the operation indication mark be higher as the magnitude of the tilting of the display unit with respect to the horizontal plane is larger, in a case that the magnitude of the tilting of the display unit with respect to the horizontal plane as detected by the tilt detection device is greater than the permitted range when the operation indication mark arrives at the first reference portion and the operating unit is operated by the player.

11. The game system according to any one of claim 1, wherein:
the tilt detection device detects magnitude of tilting of the display unit with respect to the horizontal plane when the game machine is tilted; and
the speed setting device sets the moving speed of the operation indication mark to a value obtained by dividing distance of the moving path by the setting time, in a case that the magnitude of the tilting of the display unit with respect to the horizontal plane as detected by the tilt detection device is within a permitted range which is set in advance when the operation indication mark arrives at the first reference portion and the operating unit is operated by the player.

12. The game system according to claim 11, wherein
the speed setting device makes the moving speed of the operation indication mark be higher as the magnitude of the tilting of the display unit with respect to the horizontal plane is larger, in a case that the magnitude of the tilting of the display unit with respect to the horizontal plane as detected by the tilt detection device is greater than the permitted range when the operation indication mark arrives at the first reference portion and the operating unit is operated by the player.

13. The game system according to claim 1, wherein at least one of the first and second moving speeds are not constant over the partial and remaining sections, respectively.

14. The game system according to claim 13, wherein the operation indication mark accelerates over the partial section and/or decelerates over the remaining section.

15. A control method for controlling a computer incorporated into a game system, the game system that includes a game machine comprising: a display unit that displays a game screen; an operating unit that is operated by a player; and a tilt detection device that detects tilting of the game machine with respect to the horizontal plane, and providing a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the control method making the computer execute the steps including:

a path setting step of, when the operation indication mark arrives at the first reference portion and the operating unit is operated by the player, setting a moving path which is a path along which the operation indication mark is to move from the first reference portion until arriving at the second reference portion, the moving path including a partial section and a remaining section;

a speed setting step of obtaining tilting of the game machine detected by the tilt detection device when the operation indication mark arrives at the first reference portion and the operating unit is operated by the player, and of setting a first moving speed on the basis of the tilting of the game machine that is obtained, the first moving speed being associated with the partial section;

an adjustment step of setting a second moving speed on the basis of a setting time and the first moving speed, the setting time being set in advance as a total time that the operation indication mark spends moving between the first and second reference portions; and a control step of controlling the operation indication mark so that the operation indication mark moves at the first moving speed set in the speed setting step in the partial section, and so that the operation indication mark moves at the second moving speed set in the adjustment step in the remaining section, wherein the operation indication mark spends a first moving time moving along the partial section at the first moving speed and a second moving time moving along the remaining section at the second moving speed, wherein the sum of the first and second moving times is equal to the setting time.

16. The control method according to claim 15, wherein at least one of the first and second moving speeds are not constant over the partial and remaining sections, respectively.

17. The control method according to claim 16, wherein the operation indication mark accelerates over the partial section and/or decelerates over the remaining section.

18. A non-transitory computer readable storage medium storing a computer program for a game system that includes a game machine comprising: a display unit that displays a game screen; an operating unit that is operated by a player; and a tilt detection device that detects tilting of the game machine with respect to the horizontal plane, and that provides a game in which a game region in which a first reference portion and a second reference portion that are arranged apart from each other are provided is displayed upon the game screen, and, by the player operating the operating unit when an operation indication mark for indicating respective operation timings to the player and to an opponent moves within the game region and arrives at the first reference portion which is allocated to the player, the operation indication mark can be hit back toward the second reference portion which is allocated to the opponent, the computer program making a computer incorporated into the game system function as:

a path setting device configured to, when the operation indication mark arrives at the first reference portion and the operating unit is operated by the player, set a moving path which is a path along which the operation indication mark is to move from the first reference portion until arriving at the second reference portion, the moving path including a partial section and a remaining section;

a speed setting device configured to obtain tilting of the game machine detected by the tilt detection device when the operation indication mark arrives at the first reference portion and the operating unit is operated by the player, and to set a first moving speed on the basis of the tilting of the game machine that is obtained, the first moving speed being associated with the partial section;

an adjustment device configured to set a second moving speed on the basis of a setting time and the first moving speed, the setting time being set in advance as a total time that the operation indication mark spends moving between the first and second reference portions; and a control device configured to control the operation indication mark so that the operation indication mark moves at the first moving speed set by the speed setting device in the partial section, and so that the operation indication mark moves at the second moving speed set by the adjustment device in the remaining section, wherein the operation indication mark spends a first moving time moving along the partial section at the first moving speed and a second moving time moving along the remaining section at the second moving speed, wherein the sum of the first and second moving times is equal to the setting time.

19. The non-transitory computer readable storage medium according to claim 18, wherein at least one of the first and second moving speeds are not constant over the partial and remaining sections, respectively.

20. The non-transitory computer readable storage medium according to claim 19, wherein the operation indication mark accelerates over the partial section and/or decelerates over the remaining section.

* * * * *